(12) United States Patent
Hu et al.

(10) Patent No.: US 8,532,589 B2
(45) Date of Patent: Sep. 10, 2013

(54) BEAM-HOPPING IN A RADIO COMMUNICATIONS SYSTEM

(75) Inventors: Honglin Hu, Shanghai (CN); Egon Schulz, München (DE); Martin Weckerle, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 805 days.

(21) Appl. No.: 11/920,264

(22) PCT Filed: Apr. 27, 2006

(86) PCT No.: PCT/EP2006/061892
§ 371 (c)(1),
(2), (4) Date: Dec. 22, 2008

(87) PCT Pub. No.: WO2006/120123
PCT Pub. Date: Nov. 16, 2006

(65) Prior Publication Data
US 2009/0221314 A1    Sep. 3, 2009

(30) Foreign Application Priority Data

May 11, 2005  (EP) ................................... 05010259

(51) Int. Cl.
*H04B 1/02* (2006.01)
(52) U.S. Cl.
USPC ........... 455/101; 455/143; 455/225; 455/524; 370/334; 375/347; 375/349
(58) Field of Classification Search
USPC .................. 455/524, 561, 562.1, 101, 19, 25, 455/279.1, 506, 500, 65, 143, 191.2, 225; 370/328, 324, 334; 342/403, 405, 423, 432, 342/434, 437, 445; 375/345–349, 267, 316, 375/147–150, 260, 285, 340; 343/754, 853, 343/757

See application file for complete search history.

(56) References Cited

U.S. PATENT DOCUMENTS

| | | | | |
|---|---|---|---|---|
| 4,065,644 | A * | 12/1977 | Shinosky, Jr. | 379/260 |
| 4,617,657 | A * | 10/1986 | Drynan et al. | 370/394 |
| 4,996,532 | A * | 2/1991 | Kirimoto et al. | 342/81 |
| 5,550,827 | A * | 8/1996 | Fernstrom | 370/392 |
| 6,141,335 | A | 10/2000 | Kuwahara et al. | |
| 6,671,499 | B1 | 12/2003 | Ylitalo et al. | |
| 6,885,650 | B1 * | 4/2005 | Schindler | 370/336 |
| 7,031,664 | B2 * | 4/2006 | Lee et al. | 455/67.13 |
| 7,551,680 | B2 * | 6/2009 | Goldberg | 375/267 |

(Continued)

FOREIGN PATENT DOCUMENTS

| EP | 1 365 610 | 11/2003 |
|---|---|---|
| TW | 512637 | 12/2002 |

OTHER PUBLICATIONS

Hu Honglin et al., "Performance Evaluation of Beam Hopping Communications Scheme", The 14*th* IEEE 2003 International Symposium on Personal, Indoor and Mobile Radio Communication Proceedings, pp. 2470-2474.

*Primary Examiner* — Dominic E Rego
(74) *Attorney, Agent, or Firm* — Staas & Halsey LLP

(57) ABSTRACT

A radio communications system has at least one base station and subscriber station. To transmit messages to a subscriber stations, the base station uses successive emission directions that differ from one another. The base station transmits information concerning the sequence of the use of said emission directions to subscriber stations.

15 Claims, 2 Drawing Sheets

(56) References Cited

U.S. PATENT DOCUMENTS

| | | | |
|---|---|---|---|
| 7,907,570 B2* | 3/2011 | Hwang | 455/522 |
| 2004/0014429 A1* | 1/2004 | Guo | 455/73 |
| 2004/0066766 A1* | 4/2004 | Shiu et al. | 370/335 |
| 2004/0121810 A1* | 6/2004 | Goransson et al. | 455/562.1 |
| 2004/0162034 A1* | 8/2004 | Parker | 455/82 |
| 2004/0196800 A1 | 10/2004 | Padovani et al. | |
| 2005/0064872 A1* | 3/2005 | Osseiran et al. | 455/452.1 |
| 2005/0111348 A1* | 5/2005 | Mottier et al. | 370/208 |
| 2005/0197129 A1* | 9/2005 | Cho et al. | 455/447 |
| 2005/0201339 A1* | 9/2005 | Mangin et al. | 370/337 |
| 2005/0232156 A1* | 10/2005 | Kim et al. | 370/236 |
| 2005/0265470 A1* | 12/2005 | Kishigami et al. | 375/267 |
| 2007/0140102 A1* | 6/2007 | Oh et al. | 370/208 |
| 2007/0177551 A1* | 8/2007 | Joham et al. | 370/332 |
| 2008/0069031 A1* | 3/2008 | Zhang et al. | 370/328 |
| 2008/0130613 A1* | 6/2008 | Tiedemann et al. | 370/342 |
| 2009/0067513 A1* | 3/2009 | Kim et al. | 375/260 |
| 2009/0245411 A1* | 10/2009 | Goldberg | 375/267 |
| 2009/0322585 A1* | 12/2009 | Galasso | 342/14 |

* cited by examiner

BEAM-HOPPING IN A RADIO COMMUNICATIONS SYSTEM

CROSS REFERENCE TO RELATED APPLICATIONS

This application is based on and hereby claims priority to PCT Application No. PCT/EP2006/061892 filed on Apr. 27, 2006 and European Application No. EP05010259, filed May 11, 2005, the contents of which are hereby incorporated by reference.

BACKGROUND

The invention relates to a method for communication in a radio communications system in which the base station uses different transmission directions successively in order to transmit messages to subscriber stations. The invention also relates to a base station and to a subscriber station for carrying out the method.

In radio communications systems, messages, for example with speech information, image information, video information, SMS (Short Message Service), MMS (Multimedia Messaging Service) or other data are transmitted by electromagnetic waves via a radio interface between a transmitting and a receiving station. In this case, depending on the specific configuration of the radio communications system, the stations may be different types of subscriber-end radio stations or network-end base stations. At least some of the subscriber stations in a mobile radio communications system are mobile radio stations. The electromagnetic waves are transmitted at carrier frequencies which are in the frequency band provided for the respective system.

Mobile radio communications systems are often in the form of cellular systems, for example in accordance with the GSM (Global System for Mobile Communication) or UMTS (Universal Mobile Telecommunications System) Standard with a network infrastructure comprising, for example, base stations, facilities for monitoring and control of the base stations, and further network-end facilities. In addition to these cellular, hierarchical radio networks, which are organized to cover large areas (supralocal), wire-free local area networks (WLANs, Wireless Local Area Networks) also exist, whose radio coverage area is generally spatially considerably more confined.

Examples of different Standards for WLANs are Hiper-LAN, DECT, IEEE 802.11, Bluetooth and WATM.

In radio communications systems, multiple access methods/multiplexing methods (Multiple Access, MA) are used to control the access by subscriber stations to the common transmission medium. In these multiple access methods, the transmission medium can be split in the time domain (Time Division Multiple Access, TDMA), in the frequency domain (Frequency Division Multiple Access, FDMA), in the code domain (Code Division Multiple Access, CDMA) or in the space domain (Space Division Multiple Access, SDMA) between the subscriber stations. Combinations of multiple access methods are also possible, for example the combination of a frequency domain multiple access method with a code domain multiple access method.

When using space domain multiple access methods, a base station can transmit information directionally in specific transmission directions to one subscriber station. During this process, it is possible for the beam to follow the movement of the subscriber station, or for discrete transmission directions to be used, between which switching takes place during movement of the subscriber station. Alternatively, in the case of methods which are known by the expression beam hopping, the base station uses the random principle to select one transmission direction and to transmit messages to subscriber stations in the area covered by the respective transmission direction.

SUMMARY

One possible object is to specify a method for communication by radio, in which one base station uses different transmission directions for transmission of messages. A further aim is to specify a base station and a subscriber station for carrying out the method.

The inventors propose a method for communication in a radio communications system, the base station uses different transmission directions successively in order to transmit messages to subscriber stations. The base station transmits information to subscriber stations by the sequence in which the transmission directions are used.

By way of example, the base station may be a network-end radio station in a UMTS, GSM, Wimax or WLAN system, and the subscriber station may, for example, be a stationary or mobile telephone or computer. The base station preferably has a plurality of antennas, by which it can provide the plurality of transmission directions. The subscriber stations may have one or more antennas.

One transmission direction corresponds to a specific antenna polar diagram. A plurality of these transmission directions exist, and the base station uses them successively in a specific sequence. During the time interval during which one specific transmission direction is being used, information is preferably transmitted using this transmission direction to only one subscriber station, that is to say one and only one subscriber station is supplied from the base station per transmission direction and time period for use of that transmission direction. This transmission direction can be used at the same time during this period for transmission of information to different subscriber stations by using further separation methods, such as codes or radio frequencies. When a change takes place from one transmission direction to the next transmission direction according to the sequence, the subscriber station or subscriber stations to which the base station is transmitting information preferably also changes or change. This allows different subscriber stations to receive information from the base station by sequential use of different transmission directions.

The information about the sequence is preferably transmitted omnidirectionally by broadcast, that is to say it is intended for all the subscriber stations which are currently located in the radio coverage area of that base station. In order to transmit the information about the sequence, the successive use of the various transmission directions can be interrupted, such that a first transmission direction is then used to transmit the information about the sequence omnidirectionally, after which a second transmission direction is used. It is particularly advantageous for the information about the sequence to be transmitted periodically, so that the subscriber stations are regularly informed about the sequence that is currently being used, and which may be changed from time to time.

The information about the sequence may explicitly state the sequence, that is to say first transmission direction, second transmission direction, etc; in addition, it is possible to provide an indication of which transmission direction in the sequence will be the next to be used, for example in the form a first transmission direction, second transmission direction, third transmission direction, starting with the second transmission direction. Instead of an explicit indication, a reference to a sequence which is known by the subscriber stations is also possible, for example by indicating that a specific sequence, which is known by the subscriber stations, is currently being used, and/or by referring to one transmission direction, which will be the next to be used, in a sequence which is known by the subscriber stations.

In one development, the base station transmits a pilot signal omnidirectionally for channel estimation at the subscriber station end. The pilot signal is preferably transmitted by broadcast, that is to say it is intended for all the subscriber stations which are currently located in the radio coverage area of that base station. In order to transmit the pilot signal, the successive use of the various transmission directions can be interrupted, so that a first transmission direction is used and the pilot signal is then transmitted omnidirectionally, after which a second transmission direction is used. It is particularly advantageous for the pilot signal to be transmitted periodically.

According to one advantageous refinement, after the transmission of the pilot signal, the base station receives information from at least one subscriber station about the subscriber-end reception quality relating to a plurality of transmission directions. The base station advantageously receives information relating to in each case one of the transmission directions from in each case one subscriber station, such that the information relating to a plurality of transmission directions originates from a plurality of subscriber stations. Additionally or alternatively, it is also possible for one or more subscriber stations to transmit information relating to a plurality of transmission directions. The information about the reception quality relating to one transmission direction represents a measure of how well the subscriber station from which the information originates is receiving signals from the base station when the base station is using the respective transmission direction.

The information about the subscriber-end reception quality is preferably determined from a channel estimate at the subscriber station end, using the omnidirectionally transmitted pilot signal and from information about at least some of the transmission directions. This determination process can be carried out at the network end or the subscriber end. The information about a transmission direction preferably indicates the configuration of the antenna polar diagram corresponding to that transmission direction.

In one refinement, the base station assigns radio resources for a transmission direction to a subscriber station on the basis of the received information about the reception quality. By way of example, this assignment can be transmitted immediately before or after the transmission of information about the sequence of transmission directions currently being used by the base station. The assignment process can be carried out by assigning the radio to a subscriber station in the time period during which the respective transmission direction is being used. It is possible for a plurality of transmission directions to be assigned, to be precise to in each case one different subscriber station. Additionally or alternatively, it is possible to assign radio resources for one transmission direction, like the time period in conjunction for example with codes and/or radio frequencies, to a plurality of subscriber stations.

According to one development, the base station changes the sequence in which the transmission directions are used, and transmits information about the changed sequence, on the basis of the received information about the reception quality. The information about the changed sequence can be transmitted in a corresponding manner to the transmission of the information about the previously used sequence. The change in the sequence preferably comprises omission of at least one transmission direction. For example, this means that it is possible to first of all use four transmission directions in a specific sequence, followed by three of the four transmission directions in a specific sequence. The change in the sequence makes it possible, for example, to use one transmission direction a plurality of times successively, or more often than the other transmission directions that are used. It is particularly advantageous to transmit information about the change in the sequence when information about the sequence is transmitted periodically.

In one refinement, a further base station uses different transmission directions successively in order to transmit messages to subscriber stations, with the sequence of use of the transmission directions of the base station and the sequence of use of the transmission directions of the further base station being matched to one another. The transmission directions which are used by the base station and the further base station may be the same, when seen from the respective base station as a reference point, in which case this may also relate to just some of the transmission directions. The matching of the two sequences means that it is then possible to adapt the sequence of one base station such that the other base station has changed its sequence or will change its sequence.

It is advantageous for first and second information items about subscriber-end reception quality to be determined, with the first information items being determined from a channel estimate by one subscriber station using the omnidirectionally transmitted pilot signal from the base station and using information about at least some of the transmission directions of the base station, and with the second information items being determined from a channel estimate by the subscriber station using an omnidirectionally transmitted pilot signal from the further base station and using information about at least some of the transmission directions of the further base station, and with the first and the second information items being taken into account when assigning radio resources to the subscriber station. This makes it possible to include inter-cell interference in the resource allocation for the assignment of radio resources, in particular to subscriber stations which are located in the vicinity of the boundaries of the respective radio cells.

According to one advantageous refinement, a further base station uses different transmission directions successively in order to transmit messages to subscriber stations, and the base station and the further base station transmit the same message at the same time to one subscriber station using in each case one transmission direction. In order to achieve a high reception quality at the subscriber station, the two transmission directions are chosen such that they point towards one another.

The base station proposed by the inventors has a first transmission unit to transmit messages to subscriber stations using different transmission directions successively, a second transmission unit to transmit information to subscriber stations by the sequence in which the transmission directions are used.

The subscriber station proposed by the inventors has a receiver and processor to receive and process information about the sequence in which the transmission directions are used by the base station. Furthermore, it may also have: a channel estimation unit to use a pilot signal, which is transmitted omnidirectionally by the base station, to determine information about subscriber-end reception quality from the channel estimate and using information about at least some of the transmission directions.

Both the base station and the subscriber station are particularly suitable for carrying out the method, and this statement can also relate to the refinements and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
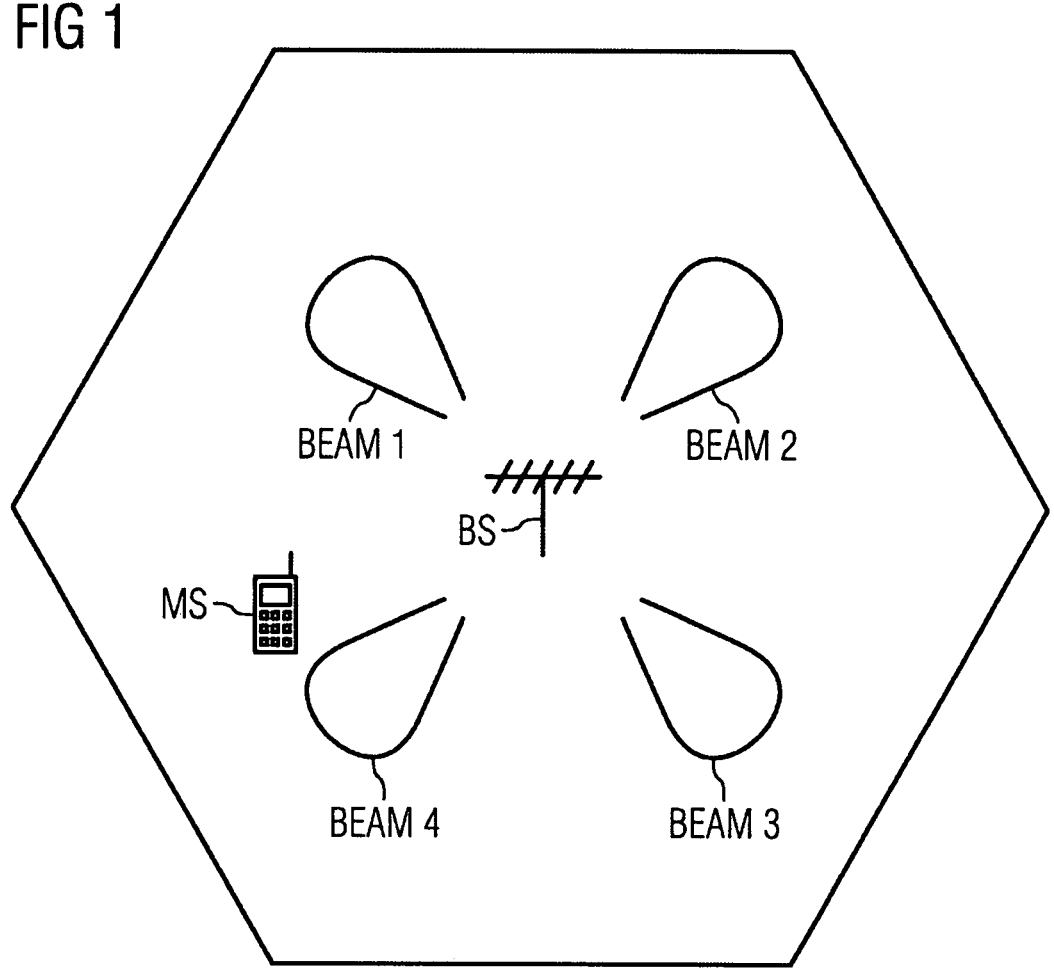
FIG. 1 shows a detail of a radio communications system.

Reference will now be made in detail to the preferred embodiments of the present invention, examples of which are illustrated in the accompanying drawings, wherein like reference numerals refer to like elements throughout.

The detail of a radio communications system illustrated in FIG. 1 shows one radio cell of a base station BS in which the mobile station MS is located. By way of example, the radio communications system may be a cellular system according to the UMTS or GSM Standard. The base station BS has a plurality of antennas, such that it can transmit signals in a plurality of transmission directions. The beams BEAM 1, BEAM 2, BEAM 3 and BEAM 4 of four transmission directions are illustrated schematically in FIG. 1. The beams which are used by the base station BS are advantageously configured such that, altogether, the beams can provide radio coverage for the entire cell. If the base station BS has M transmitting antennas and J different beams are used to transmit information to subscriber stations, then this results in J beamforming vectors $W_j=[w_{j,1}, w_{j,2}, \ldots, w_{j,M}]^T$ where $j=1 \ldots J$. The components $w_{j,i}$ are in this case the weights with which the individual antennas i are driven in order to transmit a signal via the beam j. With respect to the subscriber stations in the radio communications system, it is assumed that they do not have a plurality of antennas, but one antenna for omnidirectional reception and transmission of signals.

The base station BS uses the beams BEAM 1, BEAM 2, BEAM 3 and BEAM 4 to transmit information to subscriber stations. This means, for example, that the mobile station MS is located in the area covered by the beam BEAM 1. Messages can be transmitted from the base station BS to the mobile station MS using the beam BEAM 1. The base station BS uses a specific pattern to drive the beams BEAM 1, BEAM 2, BEAM 3 and BEAM 4, for example the sequence comprising the beam BEAM 1 first, followed by the beam BEAM 2, then the beam BEAM 3, followed by the beam BEAM 4, and then once again the beam BEAM 1, etc. By way of example, the sequence may be determined using a pseudo-random algorithm. The sudden changes between the beams BEAM 1, BEAM 2, BEAM 3 and BEAM 4 allow subscriber stations throughout the entire radio cell to be supplied from the base station BS. The same time interval, for example one time slot, is in each case available for the transmission of information using the various beams.

In order to allow the subscriber stations to identify the time-slot boundaries, the base station BS transmits synchronization information to the subscriber stations, for time synchronization.

In addition to the transmission of information in the directions of the beams BEAM 1, BEAM 2, BEAM 3 and BEAM 4, the base station BS can transmit information omnidirectionally as well, that is to say with the same amplitude in all horizontal directions. At specific times, the base station BS transmits a pilot sequence by broadcast to all the subscriber stations within the radio cell. The mobile station MS uses the omnidirectionally transmitted pilot sequence for channel estimation. The mobile station MS uses the channel estimate to determine the channel vector $H=[h_1, h_2, \ldots, h_M]^T$. The component $h_i$ of the vector H indicates the radio channel between the base station BS and the mobile station MS with respect to the antenna i of the base station BS.

A channel vector H with M elements occurs in the case of a 1-tap channel, that is to say in the case of a channel which can be described by just one complex value. In the case of narrowband systems, this is the situation when the system bandwidth is considerably narrower than the coherence bandwidth of that channel. This situation generally occurs when the delay times associated with different routes in the case of multipath propagation are short and their reciprocal values, which are proportional to the coherence bandwidth, are considerably lower than the system bandwidth. However, the method can also be used for non-1-tap channels. If the base station BS has M antennas, the mobile station MS has one antenna and the channel L taps, then H is represented by an M×L matrix.

The signal received from the mobile station MS when using the j-th beam by the base station BS is obtained from $y_j = H^H \cdot W_j \cdot x + n$ where x is the signal transmitted by the base station BS and n is the white Gaussian noise added by the radio transmission (AWGN: Additive White Gaussian Noise). If the mobile station MS can determine signal-to-noise ratios while pilot sequences are being transmitted, and if the mobile station MS knows the beamforming vectors $W_j$ and the channel vector H, then the signal-to-noise ratio of a signal which is transmitted using a specific beam can be determined by calculation.

The pilot sequence is advantageously transmitted periodically for channel estimation, for example after every n-th sudden change between the different beams. If the base station BS, for example, uses the hop sequence starting with the beam BEAM 1, followed by the beam BEAM 2 and then the beam BEAM 3 before the beam BEAM 4 and then the beam BEAM 1 etc, then the pilot sequence can be transmitted periodically after the beam BEAM 4. It is also possible to transmit the pilot sequence other than at periodically recurring times, in which case the subscriber stations then need to know these times.

If the radio channel changes slowly in comparison to the hopping frequency between the different beams, the mobile station MS can use the determination of the channel vector H to predict the reception quality that it will receive for the subsequent beams. If, for example, the base station BS is using the abovementioned hopping frequency, then the mobile station MS determines the channel vector before transmission of the beam BEAM 1. This result can be assumed to be constant for the transmission of the beams BEAM 1, BEAM 2, BEAM 3 and BEAM 4, so that, once the channel vector has been determined, the mobile station can calculate the signal-to-noise ratio for the four beams BEAM 1, BEAM 2, BEAM 3 and BEAM 4. This means that there is no need to transmit a pilot sequence individually for each beam and, in fact, it is sufficient to transmit one omnidirectionally transmitted pilot sequence for a plurality of beams. This saves radio resources in comparison to the transmission of one pilot sequence for each beam, thus increasing the spectral efficiency of the system.

Figure 2:
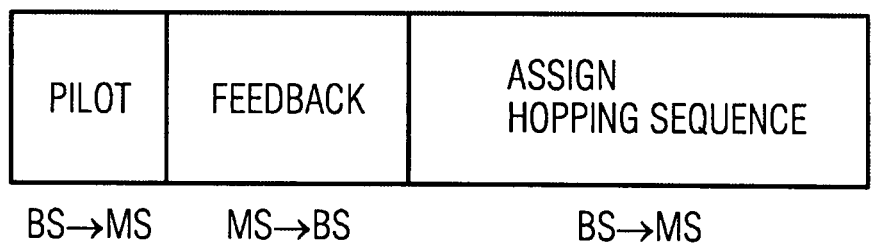
FIG. 2 shows an interchange of messages according to one embodiment, between a subscriber station and a base station.

FIG. 2 shows an interchange of messages between the mobile station MS and the base station BS, according to one embodiment. Initially, the base station BS transmits the pilot sequence PILOT, in response to which, as already described, the mobile station estimates the radio channel. The mobile station then transmits an acknowledgement FEEDBACK about the channel estimation process carried out by it to the base station BS. The acknowledgement FEEDBACK may indicate the channel vector determined by the mobile station MS, or the signal-to-noise ratio for each beam. However, before transmission of the acknowledgement FEEDBACK, the mobile station MS preferably determines the most suitable beam for it and signals this beam to the base station BS by transmitting the acknowledgement FEEDBACK. The beam which is most suitable for it is the beam whose signal-to-noise ratio has the highest value. It is also possible for the mobile station MS not to transmit an acknowledgement FEEDBACK to the base station BS on each occasion after channel estimation has been carried out but only when the signal-to-noise ratio has exceeded a specific limit value for one or more beams. This means that the mobile station MS is taken into account in the radio resource allocation process described in the following text only when a specific quality can be expected for message transmission using one beam. The less acknowledgement FEEDBACK the mobile station MS transmits to the base station BS, the less the radio resources that are used for this purpose. However, this is associated with increased processing complexity in the mobile station MS, which can also be carried out at the network end—if the signal-to-noise ratio is calculated from the channel vector and a suitable beam is selected.

The channel vectors are determined and the acknowledgement FEEDBACK is also determined in a corresponding manner after each transmission of the pilot sequence PILOT by the base station BS. The acknowledgement FEEDBACK is sent to the base station BS from all the subscriber stations in its radio cell, or at least from all those subscriber stations in its radio cell which require radio resources in the downlink direction, if appropriate subject to the condition that the expected reception quality corresponds to the threshold-value criterion for at least one beam. In order to avoid interference between the acknowledgement FEEDBACK from different subscriber stations, the messages from the various subscriber stations can be separated by codes and/or spatial transmission.

The base station BS, or a network-end facility which is connected to the base station BS, uses the received acknowledgements FEEDBACK to calculate the assignment of radio resources to the subscriber stations. If the base station BS receives positive acknowledgement FEEDBACK for one specific beam from only one subscriber station, then this beam is assigned to this subscriber station for the next transmission. If positive acknowledgement FEEDBACK is received from a plurality of subscriber stations for one specific beam, then a selection is made from these subscriber stations, in which case, for example, it is possible to take account of what reception quality can be expected for the respective subscriber stations and/or when radio resources were last assigned to the respective subscriber stations in the downlink direction. The base station then transmits the assignment of the radio resources to the subscriber stations by the information ASSIGN, by broadcast. By way of example, the contents of the information ASSIGN may be: beam 1 is assigned to subscriber station 1, beam 2 is assigned to subscriber station, etc. Since the subscriber stations know the sequence of transmission of the various beams and in addition know the constant time period for transmission of each beam, they can determine the times at which they will receive messages intended for them from the base station BS.

In addition, the base station BS transmits the information HOPPING SEQUENCE by broadcast to the subscriber stations, indicating the sequence of transmission of the various beams, starting with the beam that is to be transmitted next. The hopping sequence is advantageously transmitted for subscriber stations which have been newly added to the radio cell of the base station BS and which did not previously know the hopping sequence. Furthermore, it is worthwhile providing information about the hopping sequence when the base station BS has changed this, so that those subscriber stations which have been assigned a beam direction with the information ASSIGN can determine when the corresponding beam direction will be transmitted. The base station BS is bound to the hopping sequence which is assigned to the subscriber stations using the information ASSIGN. This means that the base station BS cannot randomly determine the next beam to be transmitted, and in fact it follows the pattern signaled to the subscriber stations.

The acknowledgements FEEDBACK as well as the information ASSIGN and HOPPING SEQUENCE are preferably transmitted as illustrated in FIG. 2 following the transmission of the pilot sequence PILOT, that is to say between the transmission of the beams. This schedule may also differ, for example by subscriber stations in a region to which a beam has been transmitted each transmitting the acknowledgements FEEDBACK. By way of example, a first beam may be transmitted, with the subscriber stations sending the acknowledgement FEEDBACK in the region of the first beam following this transmission.

A change in the hopping sequence is worthwhile when the base station does not receive a positive acknowledgement FEEDBACK for all beams. In this case, it is possible not to transmit those beams which are not good for any subscriber station. If, for example, the four beams BEAM 1, BEAM 2, BEAM 3 and BEAM 4 are being used and the subscriber stations determine that the signal-to-noise ratios for the three beams BEAM 1, BEAM 2 and BEAM 3 are high, while none of the subscriber stations is receiving a good radio channel for the beam BEAM 4, then, for example, the beams can be transmitted in the sequence BEAM 1, BEAM 2, BEAM 3, BEAM 1, BEAM 2 etc. Fundamentally, the subscriber stations know which beams can be used in the radio cell so that the signal-to-noise ratios for the beam BEAM 4 which is not currently being used can also be determined after each channel estimate, so that the beam BEAM 4 can be used again when a subscriber station is located in the area of the beam BEAM 4. This is advantageous with regard to the mobility of subscriber stations. This flexible procedure relating to the transmission of information using the various beams which can in principle be used leads to economic use of radio resources, since beams which lead to good reception quality are used, while beams which would lead to poor reception quality are not used. The described flexible procedure also leads to savings in terms of the transmission power of the base station since, when using a poor beam, the transmission power of the base station must be set to be high, in order to achieve acceptable reception quality at the respective subscriber station. A change in the hopping frequency therefore becomes more probable the smaller the number of subscriber stations which are located in the radio cell. This means that the procedure is advantageous for any given numbers of subscriber stations, and in particular for low subscriber station densities.

If the radio communications system comprises a plurality of radio cells, it is advantageous to determine the hopping sequences of adjacent cells such that they are orthogonal with respect to one another, that is to say such that beams from adjacent cells do not point towards one another at any time. FIG. 3a illustrates a situation such as this, illustrating a detail of a radio communications system comprising three radio cells. The radio cells are supplied by the base stations BS1, BS2 and BS3. A plurality of subscriber stations are located in each of the radio cells. The mobile station MS is located at the center in the vicinity of the intersection of the three cells, so that it can receive signals from each of the three base stations BS1, BS2 and BS3. The beam that is currently being used by it is illustrated schematically for each of the base stations BS1, BS2 and BS3. The beams from the various base stations BS1, BS2 and BS3 do not interfere with one another in the situation in FIG. 3a, that is to say subscriber stations which are currently receiving the beam from the base station BS1 are not interfered with by the beams from the base stations BS2 and BS3, and vice versa. For example the mobile station MS can therefore receive messages from the base station BS3 without at the same time having to receive signals from the base stations BS1 and BS2, since the beams from the base stations BS1 and BS2 are not pointing towards the mobile station MS.

Figure 3B:
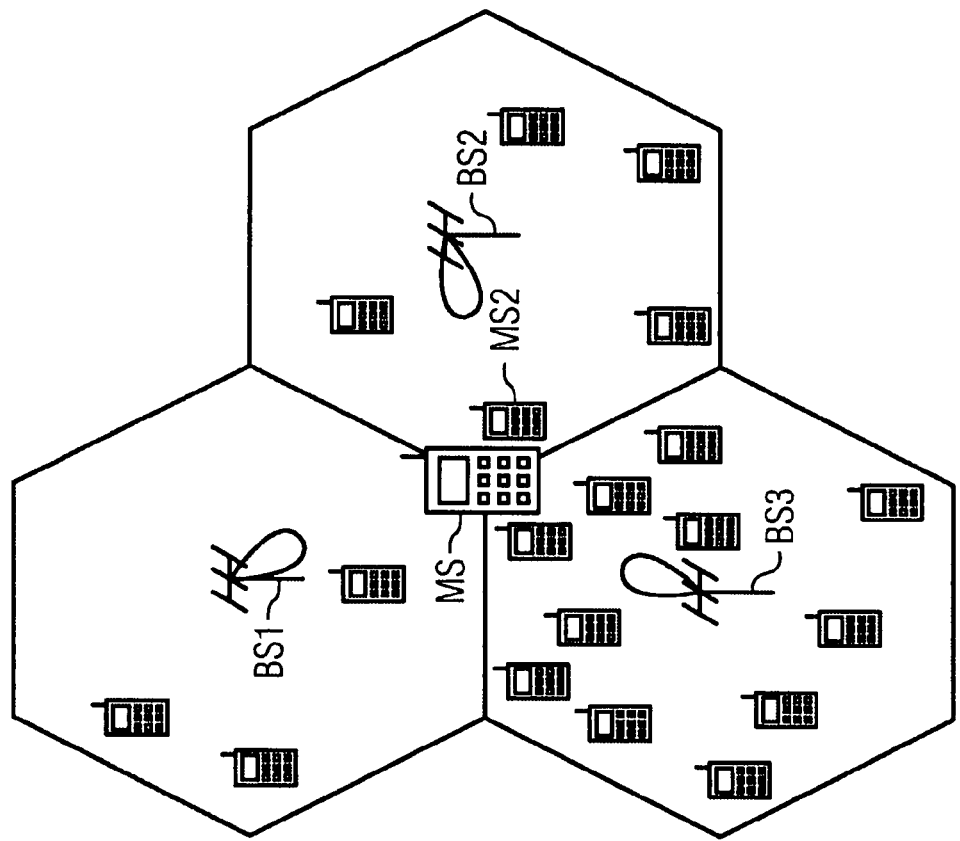
FIG. 3b shows a secondary detail, comprising a plurality of radio cells, from a radio communications system.
Figure 3A:
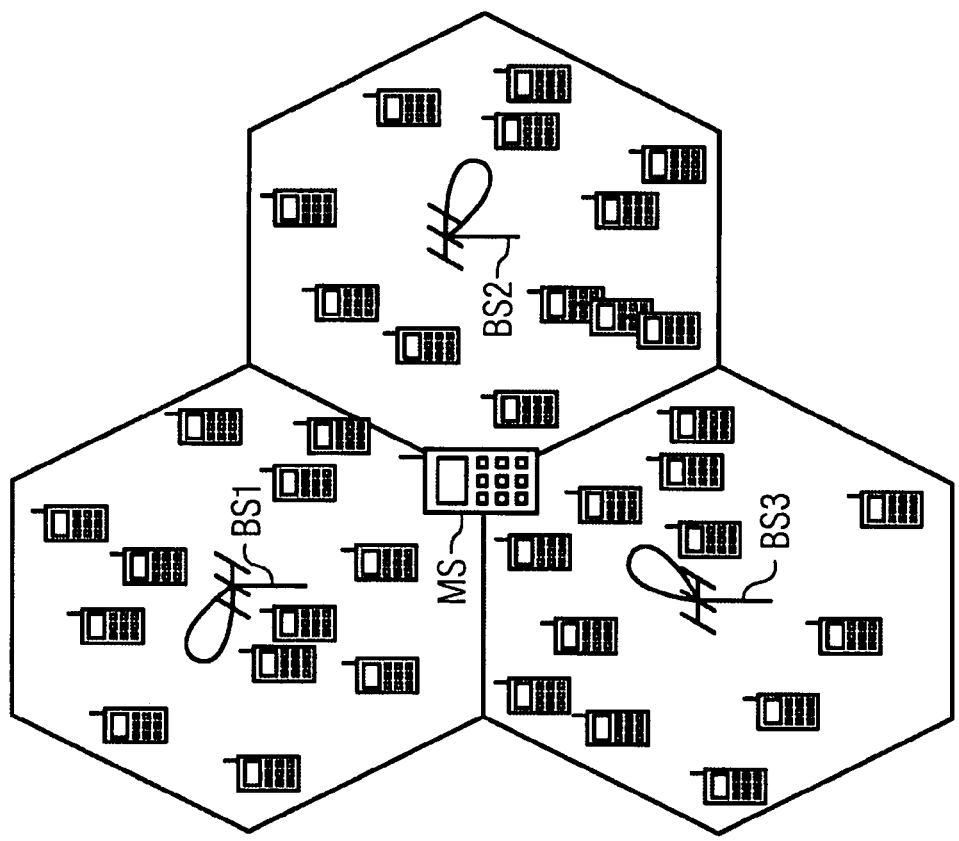
FIG. 3a shows a first detail, comprising a plurality of radio cells, from a radio communications system.

FIG. 3b shows a situation in which the hopping sequences of the base stations BS1, BS2 and BS3 are not orthogonal. For example, the beams from the three base stations BS1, BS2 and BS3 are pointing at the mobile station MS at the same time at the time illustrated in FIG. 3b. If the mobile station MS receives a message from the base station BS1 at this time, then this will be interfered with by the beams from the base stations BS2 and BS3.

If a change in the hopping sequence of one of the base stations BS1, BS2 and BS3 takes place only occasionally, then the hopping sequences of the base stations BS1, BS2 and BS3 can remain synchronized by the respective other base stations BS1, BS2 and BS3 matching themselves to the change. This allows the orthogonality between the hopping sequences of the various cells to be maintained all the time. This procedure is particularly suitable for high subscriber station densities.

Furthermore, it is possible for subscriber stations which are located in the boundary region between a plurality of radio cells to receive and decode the broadcast information from the adjacent base stations. This allows a subscriber station to evaluate the pilot sequence transmitted from an adjacent base station and therefore to estimate the radio channel between the adjacent base station and the subscriber station, so that the subscriber station knows the interference (co-channel interference) produced by adjacent cells. Furthermore, the subscriber station can establish the hopping sequence used by the adjacent base station from the information transmitted by the adjacent base station.

When there are a plurality of radio cells, subscriber stations which are receiving signals not only from their own base station but also from an adjacent base station can determine and take into account not only the radio propagation conditions in conjunction with the hopping frequency of their own radio cell but also the radio propagation conditions in conjunction with the hopping frequency of the adjacent cell. If, for example, one subscriber station finds that it has a high signal-to-noise ratio for a first beam of its own base station but that this beam is being transmitted at the same time as a beam from an adjacent base station which also results in a high signal-to-noise ratio, then the base station should not signal this first beam as being a suitable beam. If the subscriber station transmits to its base station the values determined by it for the signal-to-noise ratio for one or more beams from its base station, then this signal-to-noise ratio can be corrected by the signal-to-noise ratio of the respective beam transmitted at the same time by an adjacent base station such that the efficient signal-to-noise ratio is signaled to the base station. The base station can also take account of adjacent radio cells by the subscriber station estimating the radio channel between the adjacent base station and the subscriber station, and passing on this result to its own base station.

The situation illustrated in FIG. 3b, in which the mobile station MS is, for example, receiving messages from the base station BS3 and is at the same time subject to interference from the beam from the base station BS2 can occur only when a subscriber station in the radio cell of the base station BS2 is located in the area of the beam, as illustrated in FIG. 3b, from the base station BS2 and messages are currently being received from the base station BS2. By way of example, this can occur with the mobile station MS2. If this were not the case, the base station BS2 would currently not use the illustrated beam. In order to avoid the interference situation, which is poor for both mobile stations MS and MS2, it is possible not to assign any radio resources for the illustrated beam to the mobile station MS2, and to transmit a message which is intended to be transmitted to the mobile station MS simultaneously both via the base station BS3 and via the base station BS2.

This can be done as follows: if the mobile station MS finds that it is experiencing a poor interference situation, since beams from base stations BS2 and BS3 are reaching the mobile station MS at the same time, each with a good signal-to-noise ratio, that is to say when there is major interference in the orthogonality of the hopping frequencies of the two adjacent base stations BS2 and BS3, the mobile station MS sends a request to the base station BS2 that is adjacent to its base station BS3. This request instructs the adjacent base station BS2 to transmit the message to the mobile station MS at the same time that the message is transmitted by the base station BS3. Alternatively, the request can also be sent to the base station BS3. This allows the mobile station MS to communicate with a plurality of base stations at the same time, corresponding to the known soft-handover method. As a result of the simultaneous message reception from the two base stations BS2 and BS3, the mobile station MS experiences an improved reception quality. If the radio channel between the base station BS2 and the mobile station MS on the one hand and between the base station BS3 and the mobile station MS on the other hand is known at the network end, then a maximum ratio-combining method can be used at the transmitter end, that is to say by the base stations BS2 and BS3, in order to improve the quality of message transmission.

The mobile station MS2 which is disadvantageously affected by the described procedure is assigned orthogonal radio resources, for example a later time slot, during which the beam illustrated in FIG. 3b is transmitted, or is assigned a different radio frequency from transmission of the illustrated beam. If the radio channels between the base station BS2 and the mobile station MS, between the base station BS3 and the mobile station MS, between the base station BS2 and the mobile station MS2 and between the base station BS3 and the mobile station MS2 are known at the network end, then a joint transmission method can be used at the transmitter end. In this case, the signals are predistorted for the two mobile stations MS and MS2 such that the mobile stations MS and MS2 each essentially receive the message that is intended for them. The signals transmitted from the base stations BS3 and BS2 are equalized by the radio channel such that the signal components which are intended for the mobile station MS from the equalized signals from the base station BS3 and the equalized signals from the base station BS2 are constructively superimposed at the location of the mobile station MS, and the signal components which are intended for the mobile station MS2 cancel one another out at the location of the mobile station MS. A converse situation applies to the mobile station MS2.

The situation illustrated in FIG. 3b is also suitable for carrying out a soft-handover for the mobile station MS between, for example, the base station BS3 and the base station BS2. While a hard-handover must be carried out if the hopping frequencies of adjacent base stations are orthogonal, the presence of non-orthogonal hopping frequencies can be used for a soft-handover, in which, as described above, the mobile station MS receives signals from the two base stations involved in the handover, at the same time.

While the method has been described with reference to the situation in which a mobile station has only one omnidirectional transmitting and receiving antenna, it can also be used in the situation in which the mobile station has a plurality of antennas. If the base station has M antennas and the mobile station has N antennas, then the channel estimation process in the mobile station results in determination of the matrix H of dimension M×N.

The base station and the subscriber station also include permanent or removable storage, such as magnetic and optical discs, RAM, ROM, etc. on which the process and data structures of the present invention can be stored and distributed. The system can output the results to a display device, printer, readily accessible memory or another computer on a network.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method using beam hopping wherein each beam is associated with a transmission direction for data communication in a radio communications system which has at least one base station with subscriber stations, comprising:
    successively using different transmission directions for data communication at the base station; and
    transmitting by the base station sequence information to the subscriber stations, the sequence information specifying a sequence in which the transmission directions are used, including transmitting to the subscriber stations updated sequence information about a change of the sequence.

2. The method as claimed in claim 1, wherein
    the base station changes the sequence in which the transmission directions are used based on a reception quality of the data communication determined for one or more of the transmission directions.

3. The method as claimed in claim 2, wherein
    the reception quality is determined at the base station based on feedback information from at least one subscriber station about reception quality at the subscriber station relating to one or more of the transmission directions.

4. The method as claimed in claim 3, wherein the feedback information is determined from a channel estimate at the subscriber station, using a pilot signal and information about one or more of the transmission directions.

5. The method as claimed in claim 4, wherein
    the base station transmits the pilot signal omni-directionally for channel estimation at the subscriber station end.

6. The method as claimed in claim 4, wherein
    the base station uses the feedback information to change the sequence in which the transmission directions are used, and
    the base station transmits updated sequence information about the change to the sequence.

7. The method as claimed in claim 2, wherein the change to the sequence comprises omission of at least one transmission direction.

8. The method as claimed in claim 1, wherein
    at least two base stations successively use different transmission directions to transmit messages to subscriber stations,
    the base stations use transmission direction sequences that are matched to one another.

9. The method as claimed in claim 8, wherein
    the base stations transmit messages in adjacent cells which would interfere with one another when received at same time at a subscriber station; and
    the transmission direction sequences are matched such that the transmission directions used in the cells do not point to the subscriber station at same time.

10. The method as claimed of claim 8, wherein the base stations transmit a same message in adjacent cells to a subscriber station; and
    the transmission direction sequences are matched such that the transmission directions used in the cells point to the subscriber station at same time.

11. A base station for a radio communications system, comprising:
    a first transmission unit that uses beam hopping for data communication, each beam associated with a transmission direction, and successively uses different transmission directions for data communication with subscriber stations; and
    a second transmission unit that transmits sequence information to the subscriber stations, the sequence information specifying a sequence in which the transmission directions are used, including transmission, to the subscriber stations, of updated sequence information about a change of the sequence.

12. The base station as claimed in claim 11, further comprising:
    a determination unit to determine about the change of the sequence in which the transmission directions are used based on a reception quality of the data communication for one or more of the transmission directions.

13. The base station as claimed in claim 11, further comprising:
    a receiver to receive feedback information from at least one subscriber station about reception quality at the subscriber station relating to one or more of the transmission directions; and
    the determining unit configured to determine the reception quality at the subscriber station based on the received feedback information.

14. A subscriber station for data communication with the base station according to claim 11, comprising:
    a receiver to receive sequence information about the sequence in which the transmission directions are used by the base station; and
    a processor to process the received sequence information.

15. The subscriber station as claimed in claim 14 further comprising:
    a determining unit to determine a reception quality for the data communication with the base station; and a transmitter to transmit feedback information related to the reception quality to the base station.

* * * * *